United States Patent
Momose et al.

(10) Patent No.: US 10,551,229 B2
(45) Date of Patent: Feb. 4, 2020

(54) CAPACITIVE ELECTROMAGNETIC FLOWMETER

(71) Applicant: AZBIL CORPORATION, Chiyoda-ku (JP)

(72) Inventors: Osamu Momose, Chiyoda-ku (JP);
Hiroyuki Inagaki, Chiyoda-ku (JP);
Kouichi Mamada, Chiyoda-ku (JP);
Yoshio Yamazaki, Chiyoda-ku (JP);
Takumi Yamashita, Chiyoda-ku (JP)

(73) Assignee: AZBIL CORPORATION, Chiyoda-ku (JP)

(*) Notice: Subject to any disclaimer, the term of this patent is extended or adjusted under 35 U.S.C. 154(b) by 0 days.

(21) Appl. No.: 16/299,536

(22) Filed: Mar. 12, 2019

(65) Prior Publication Data

US 2019/0285446 A1    Sep. 19, 2019

(30) Foreign Application Priority Data

Mar. 13, 2018   (JP) .................................. 2018-045387

(51) Int. Cl.
*G01F 1/58* (2006.01)
*G01F 1/60* (2006.01)

(52) U.S. Cl.
CPC .............. *G01F 1/60* (2013.01); *G01F 1/584* (2013.01); *G01F 1/588* (2013.01)

(58) Field of Classification Search
None
See application file for complete search history.

(56) References Cited

U.S. PATENT DOCUMENTS

| 4,539,853 | A  | * | 9/1985 | Appel    | G01F 1/58 |
|-----------|----|---|--------|----------|-----------|
|           |    |   |        |          | 73/861.12 |
| 2005/0183514 | A1 | * | 8/2005 | Huybrechts | G01F 1/588 |
|           |    |   |        |          | 73/861.12 |
| 2005/0193833 | A1 | * | 9/2005 | Huybrechts | G01F 1/588 |
|           |    |   |        |          | 73/861.12 |

FOREIGN PATENT DOCUMENTS

| JP | 2004-226394 | 8/2004 |
| JP | 2014-181918 | 9/2014 |

OTHER PUBLICATIONS

Sasaki, "SW/FF Type New Electromagnetic Flowmeter" in Journal of the Mining and Metallurgical Institute of Japan, vol. 97 (1981), No. 1124, pp. 11-14).

* cited by examiner

*Primary Examiner* — Harshad R Patel
(74) *Attorney, Agent, or Firm* — Oblon, McClelland, Maier & Neustadt, L.L.P.

(57) ABSTRACT

A preamplifier substrate on which a preamplifier is mounted, the preamplifier being configured to amplify electromotive forces detected by a pair of surface electrodes, is disposed outside a flux region where a magnetic flux is produced, and the preamplifier substrate extends in a direction intersecting a measuring tube.

9 Claims, 16 Drawing Sheets

CAPACITIVE ELECTROMAGNETIC FLOWMETER

CROSS-REFERENCE TO RELATED APPLICATIONS

The present application is based on and claims priority to Japanese Application No. 2018-045387, filed Mar. 13, 2018, the entire contents of which are incorporated herein by reference.

BACKGROUND

1. Field

The present disclosure relates to a capacitive electromagnetic flowmeter that measures the flow rate of a fluid without requiring electrodes for detecting electromotive force generated in the fluid to come into contact with the fluid.

2. Description of the Related Art

An electromagnetic flowmeter is a measuring instrument that includes an exciting coil configured to generate a magnetic field in a direction orthogonal to the longitudinal direction of the flow of a fluid in a measuring tube, and a pair of electrodes disposed on the measuring tube so as to extend in a direction orthogonal to the magnetic field generated by the exciting coil. The electromagnetic flowmeter detects electromotive force generated between the electrodes while alternating the polarity of exciting current flowing in the exciting coil, and thereby measures the flow rate of a fluid to be detected flowing in the measuring tube.

In general, electromagnetic flowmeters are roughly divided into a contact type and a capacitive type (or non-contact type. The contact electromagnetic flowmeter detects electromotive force in a fluid to be measured by allowing electrodes on the inner wall of a measuring tube to come into direct contact with the fluid. The capacitive electromagnetic flowmeter detects electromotive force in a fluid to be measured using capacitance between the fluid and electrodes on the outer periphery of a measuring tube, without requiring contact of the electrodes with the fluid.

In the capacitive electromagnetic flowmeter, the electromotive force generated between the electrodes is amplified by a signal amplifying circuit (e.g., differential amplifier circuit), converted by an analog-to-digital (A/D) converter circuit into a digital signal, input to a program processing device, such as a microcontroller, and then subjected to a predetermined computation for determining a measured flow rate value. Capacitive electromagnetic flowmeters have been a particular focus of attention in recent years, because electrodes do not easily deteriorate and have low maintenance requirements.

The capacitive electromagnetic flowmeter is configured not to require contact of electrodes with a fluid to be detected. This leads to extremely high impedance between the fluid and the electrodes, and makes a first-stage signal amplifying circuit susceptible to noise. If noise is superimposed on lines between the electrodes and the input terminal of the signal amplifying circuit, the measurement accuracy and stability of the electromagnetic flowmeter may be degraded.

As a technique for reducing the effect of noise caused by high impedance between a fluid to be detected and electrodes, Related Technique 1 using guard electrodes and shielded lines has been proposed (see, e.g., Japanese Unexamined Patent Application Publication No. 2004-226394). FIGS. 11 and 12 illustrate a capacitive electromagnetic flowmeter based on Related Technique 1. As illustrated, a pair of surface electrodes 92A and 92B is disposed on the outer periphery of a measuring tube 90A which defines a flow path 90. The surface electrodes 92A and 92B are disposed opposite each other so as to be orthogonal to a magnetic field generated by exciting coils 91A and 91B. The surface electrodes 92A and 92B are individually covered by guard electrodes 93A and 93B, respectively. Additionally, the surface electrodes 92A and 92B are connected by shielded lines 94A and 94B to preamplifiers 95A and 95B, respectively, which are mounted on a preamplifier substrate 96. With this configuration, the effect of external noise is reduced.

As an anti-noise technique for small-size capacitive electromagnetic flowmeters aimed at the factory automation (FA) market, Related Technique 2 using a shielding case has been proposed recently (see, e.g., Japanese Unexamined Patent Application Publication No. 2014-181918). FIGS. 13 to 15 illustrate a capacitive electromagnetic flowmeter based on Related Technique 2. As illustrated, a preamplifier substrate is divided into two preamplifier substrates 96A and 96B, which are disposed in immediate proximity to the surface electrodes 92A and 92B, respectively, for compactness of the capacitive electromagnetic flowmeter. The entire electric circuit extending from the surface electrodes 92A and 92B to the preamplifier substrates 96A and 96B is covered with a shielding case 97 to reduce the effect of external noise.

The capacitive electromagnetic flowmeter based on Related Technique 1 is disadvantageous in that wiring materials are costly and the wiring is complex. The capacitive electromagnetic flowmeter based on Related Technique 2 is disadvantageous in that it is susceptible not only to heat from the exciting coils and the fluid, but also to magnetic flux differential noise from the magnetic circuit.

In the capacitive electromagnetic flowmeter based on Related Technique 1, as illustrated in FIG. 11, signal amplification in a differential amplifier 95C is preceded by impedance conversion in the preamplifiers 95A and 95B having a gain of 1. The resulting low-impedance output signals are used to shield-drive the guard electrodes 93A and 93B and shielded conductors of the shielded lines 94A and 94B. This is to prevent attenuation of the flow-rate signal level caused by capacitance between the core and the shielded conductor of each of the shielded lines 94A and 94B, because there is some distance from the surface electrodes 92A and 92B to the preamplifier substrate 96 as illustrated in FIG. 12.

When the surface electrodes 92A and 92B and the preamplifier substrate 96 are distant from each other, the shield driving needs to be performed using the shielded lines 94A and 94B. This is disadvantageous, as described above, in that the wiring materials are costly and the wiring is complex.

Unlike the capacitive electromagnetic flowmeter based on Related Technique 1, the capacitive electromagnetic flowmeter based on Related Technique 2 does not require the guard electrodes 93A and 93B and the shielded lines 94A and 94B. This is because the preamplifier substrates 96A and 96B are disposed in immediate proximity to the surface electrodes 92A and 92B, and this eliminates the need for the preamplifiers 95A and 95B to perform shield driving. It is thus possible to reduce the cost of wiring materials and ease the wiring.

However, when the preamplifier substrates 96A and 96B are disposed in immediate proximity to the surface electrodes 92A and 92B as in the capacitive electromagnetic flowmeter based on Related Technique 2, the preamplifier substrates 96A and 96B are located in immediate proximity to, and between, the two exciting coils 91A and 91B as illustrated in FIGS. 13 and 14. This makes the preamplifier substrates 96A and 96B very susceptible to heat from the exciting coils 91A and 91B.

Also, as illustrated in FIG. 15, the preamplifier substrates 96A and 96B are secured through substrate holders 98A and 98B to the measuring tube 90A. The preamplifier substrates 96A and 96B are thus easily affected, through the substrate holders 98A and 98B, by the temperature of the fluid flowing in the measuring tube 90A. Since the preamplifier substrates 96A and 96B are separated up and down, the resulting temperature difference between the preamplifier substrate 96A on the upper side and the preamplifier substrate 96B on the lower side may further increase the thermal effect described above, depending on the installation conditions where the capacitive electromagnetic flowmeter is installed. The thermal effect causes the occurrence of different temperature drifts in the preamplifiers 95A and 95B, and deteriorates measurement accuracy.

As illustrated in FIG. 14, the preamplifier substrates 96A and 96B are located in immediate proximity to a flux region F of a magnetic flux Φ produced by a magnetic circuit. This makes the preamplifier substrates 96A and 96B susceptible to magnetic flux differential noise during switching of excitation polarity. For example, when the magnetic flux Φ produced by a magnetic circuit 91 (see FIG. 16) including an exciting coil 91C and a yoke 91D passes across a copper foil pattern on the preamplifier substrates 96A and 96B, the resulting eddy current causes the occurrence of magnetic flux differential noise (see, e.g., "SW/FF Type New Electromagnetic Flowmeter" by Sasaki in Journal of the Mining and Metallurgical Institute of Japan, Vol. 97 (1981), No. 1124, pp. 11-14).

As shown in FIG. 17, the effect of such magnetic flux differential noise appears in a flow-rate signal (electromotive force) obtained from the surface electrodes 92A and 92B. The greater the effect of magnetic flux differential noise, the longer the waiting time before the flow-rate signal is stabilized. Therefore, the exciting frequency cannot be increased, and this leads to increased susceptibility to 1/f noise.

The magnetic flux differential noise also occurs in the shielded lines 94A and 94B. For example, when, as illustrated in FIG. 18, the shielded lines 94A and 94B are positioned so as to intersect a magnetic flux direction Y of the magnetic flux Φ, the magnetic flux differential noise occurs in proportion to the size of a signal loop LP formed by the shielded lines 94A and 94B. To reduce the magnetic flux differential noise, it is necessary to minimize a loop area S of the signal loop LP as viewed in the magnetic flux direction Y. However, the longer the shielded lines 94A and 94B, the more difficult it is to reduce the loop area S.

SUMMARY

The present disclosure has been made to solve the problems described above. An object of the present disclosure is to provide a capacitive electromagnetic flowmeter that can reduce, without requiring guard electrodes or shielded lines, the thermal effect from the exciting coil or fluid and the effect of magnetic flux differential noise caused by the magnetic circuit.

To achieve the object described above, a capacitive electromagnetic flowmeter according to an aspect of the present disclosure includes a measuring tube through which a fluid to be measured flows; an exciting coil configured to apply a magnetic flux to the fluid along a second direction orthogonal to a first direction, the first direction being a longitudinal direction of the measuring tube; a pair of surface electrodes including a first surface electrode and a second surface electrode on an outer periphery of the measuring tube, the first and second electrodes being disposed opposite each other, with the measuring tube interposed therebetween, in a third direction orthogonal to the first and second directions; a preamplifier substrate having a preamplifier mounted thereon, the preamplifier being configured to amplify electromotive forces detected by the pair of surface electrodes; and a pair of connection lines including a first connection line and a second connection line configured to electrically connect the first surface electrode and the second surface electrode, respectively, to the preamplifier. The preamplifier substrate is spaced from the exciting coil in the first direction and extends in a direction intersecting the measuring tube.

A capacitive electromagnetic flowmeter according to another aspect of the present disclosure includes a measuring tube through which a fluid to be measured flows; an exciting coil configured to apply a magnetic flux to the fluid along a second direction orthogonal to a first direction, the first direction being a longitudinal direction of the measuring tube; a pair of surface electrodes including a first surface electrode and a second surface electrode on an outer periphery of the measuring tube, the first and second electrodes being disposed opposite each other, with the measuring tube interposed therebetween, in a third direction orthogonal to the first and second directions; a preamplifier substrate having a preamplifier mounted thereon, the preamplifier being configured to amplify electromotive forces detected by the pair of surface electrodes; and a pair of connection lines including a first connection line and a second connection line configured to electrically connect the first surface electrode and the second surface electrode, respectively, to the preamplifier. The preamplifier substrate is disposed outside a flux region where a magnetic flux is produced, and extends in a direction intersecting the measuring tube.

In a configuration of the capacitive electromagnetic flowmeter described above, the preamplifier substrate may have a tube hole that allows the measuring tube to entirely or partially pass therethrough.

In another configuration of the capacitive electromagnetic flowmeter described above, the preamplifier substrate may have a plurality of protrusions along a perimeter of the tube hole, the protrusions abutting against the outer periphery of the measuring tube.

Another configuration of the capacitive electromagnetic flowmeter described above may further include a shielding case configured to shield the pair of surface electrodes, the pair of connection lines, and the preamplifier.

In another configuration of the capacitive electromagnetic flowmeter described above, the preamplifier substrate may have a shielding pattern at least in a region abutting against the shielding case.

In another configuration of the capacitive electromagnetic flowmeter described above, the shielding case may be composed of two separate shielding cases, one being configured to shield the pair of surface electrodes and the pair of connection lines, and the other being configured to shield the preamplifier.

In another configuration of the capacitive electromagnetic flowmeter described above, the first connection line may include a first tube-side wiring pattern formed on the outer periphery of the measuring tube and connected at one end thereof to the first surface electrode, a first substrate-side wiring pattern formed on the preamplifier substrate and connected at one end thereof to the preamplifier, and a first jumper wire connecting the other end of the first tube-side wiring pattern to the other end of the first substrate-side wiring pattern; and the second connection line may include a second tube-side wiring pattern formed on the outer periphery of the measuring tube and connected at one end thereof to the second surface electrode, a second substrate-side wiring pattern formed on the preamplifier substrate and connected at one end thereof to the preamplifier, and a second jumper wire connecting the other end of the second tube-side wiring pattern to the other end of the second substrate-side wiring pattern.

In another configuration of the capacitive electromagnetic flowmeter described above, the measuring tube may be made of ceramic, and the first and second surface electrodes and the first and second tube-side wiring patterns may be made of metal thin films integrally formed by metallizing the outer periphery of the measuring tube.

The present disclosure provides a capacitive electromagnetic flowmeter that can reduce, without requiring guard electrodes or shielded cables, the thermal effect from the exciting coil or fluid and the effect of magnetic flux differential noise caused by the magnetic circuit. This makes it possible to reduce temperature drift in the preamplifier caused by the thermal effect and thus to measure the flow rate with high accuracy.

DETAILED DESCRIPTION

Embodiments of the present disclosure will now be described with reference to the drawings.

First Embodiment

Figure 1:
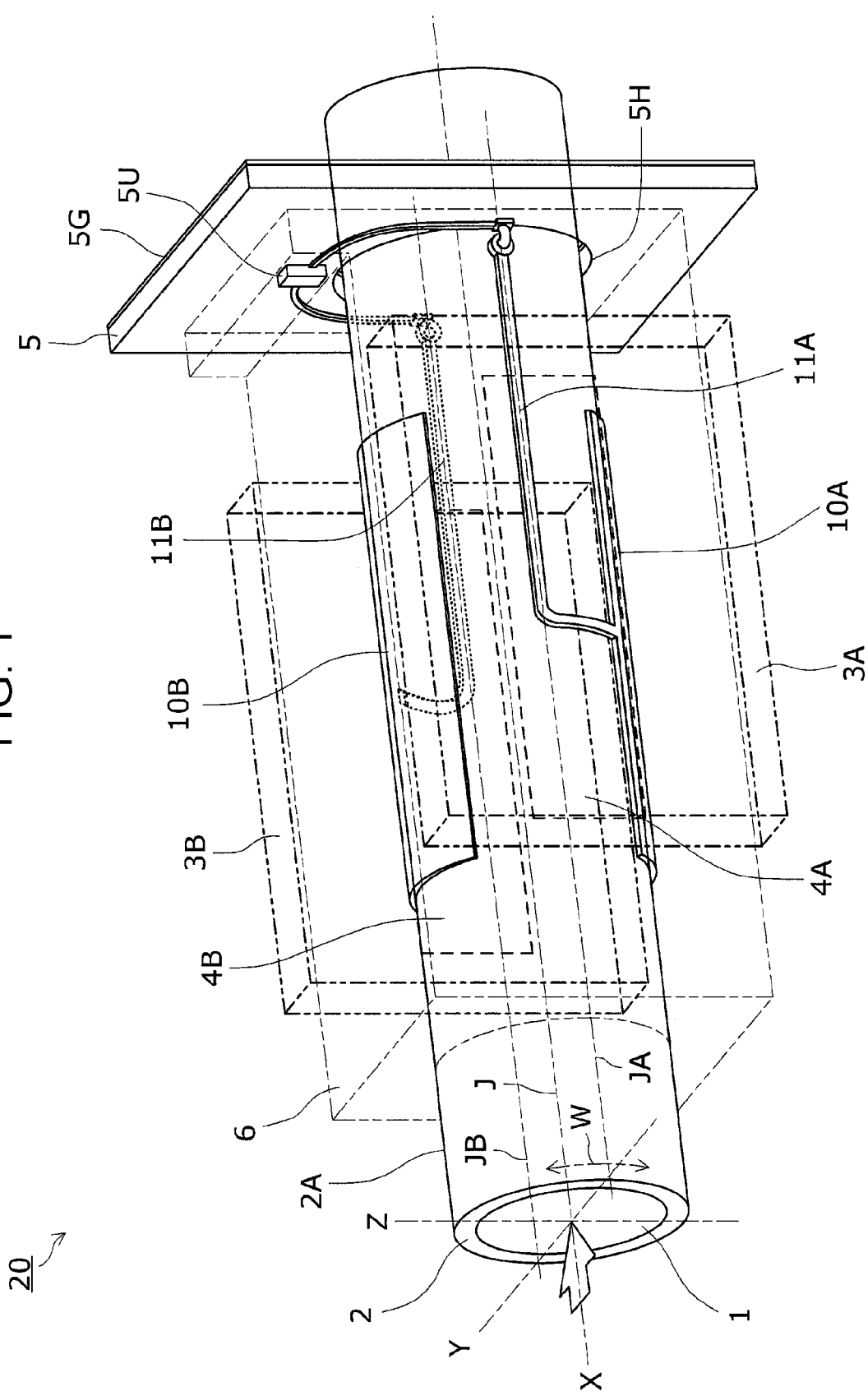
FIG. 1 is a perspective view illustrating a detecting unit of a capacitive electromagnetic flowmeter according to a first embodiment.
Figure 2:
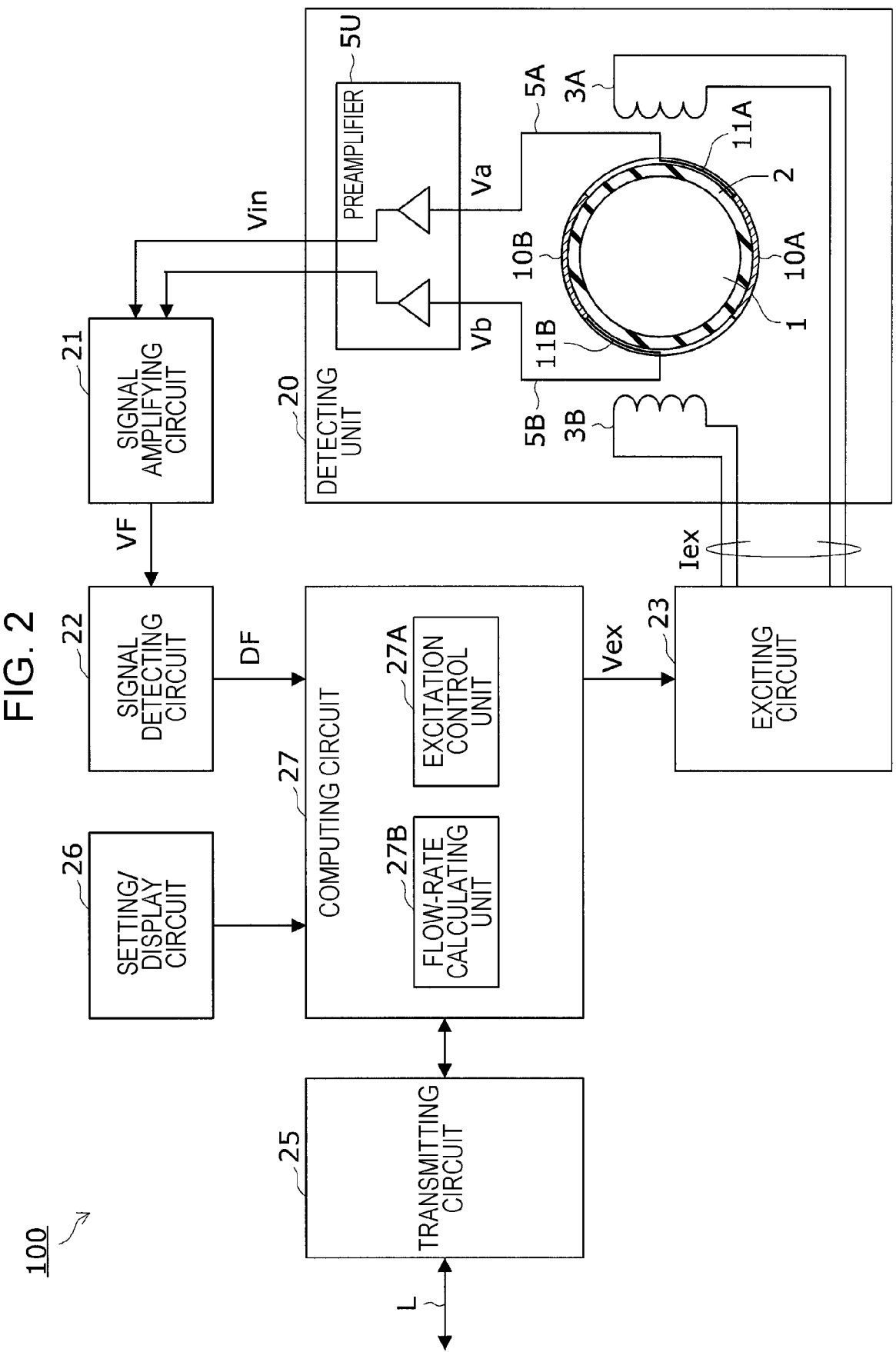
FIG. 2 is a block diagram illustrating a circuit configuration of the capacitive electromagnetic flowmeter according to the first embodiment.

First, with reference to FIGS. 1 and 2, a capacitive electromagnetic flowmeter 100 according to a first embodiment of the present disclosure will be described. FIG. 1 is a perspective view illustrating a detecting unit of a capacitive electromagnetic flowmeter according to the first embodiment. FIG. 2 is a block diagram illustrating a circuit configuration of the capacitive electromagnetic flowmeter according to the first embodiment.

(Capacitive Electromagnetic Flowmeter)

In the capacitive electromagnetic flowmeter 100, a magnetic flux applied by an exciting coil produces electromotive force in a fluid (object to be measured) flowing in a measuring tube, and electrodes on the outer periphery of the measuring tube detect the electromotive force using capacitance between the fluid and the electrodes. The detected electromotive force is then amplified, sampled, and subjected to signal processing. With this configuration, the capacitive electromagnetic flowmeter 100 measures the flow rate of the fluid without requiring contact of the electrodes with the fluid.

As illustrated in FIG. 2, the capacitive electromagnetic flowmeter 100 includes circuit units, such as a detecting unit 20, a signal amplifying circuit 21, a signal detecting circuit 22, an exciting circuit 23, a transmitting circuit 25, a setting/display circuit 26, and a computing circuit (or central processing unit (CPU)) 27.

The detecting unit 20 mainly includes a measuring tube 2, exciting coils 3A and 3B, surface electrodes 10A and 10B, and a preamplifier 5U. The detecting unit 20 is configured such that electromotive forces Va and Vb proportional to the velocity of the fluid flowing through a flow path 1 in the measuring tube 2 are detected by the surface electrodes 10A and 10B, and an alternating detection signal Vin corresponding to the electromotive forces Va and Vb is output.

The signal amplifying circuit 21 filters out noise components contained in the detection signal Vin from the detecting unit 20, amplifies the resulting signal, and outputs an alternating flow-rate signal VF obtained by the amplification. The signal detecting circuit 22 sample-holds the flow-rate signal VF from the signal amplifying circuit 21, A/D-converts the resulting direct-current voltage to a flow-rate amplitude value DF, and outputs the flow-rate amplitude value DF to the computing circuit 27.

A flow-rate calculating unit 27B of the computing circuit 27 calculates the flow rate of the fluid on the basis of the flow-rate amplitude value DF from the signal detecting circuit 22, and outputs the calculated flow rate as a flow-rate measurement result to the transmitting circuit 25. By transmitting and receiving data to and from a higher-level device through a transmission path L, the transmitting circuit 25 sends the flow-rate measurement result and a nil-state determination result, which are obtained by the computing circuit 27, to the higher-level device.

On the basis of an excitation control signal Vex from an excitation control unit 27A of the computing circuit 27, the exciting circuit 23 supplies an alternating exciting current Iex to the exciting coils 3A and 3B.

The setting/display circuit 26 detects, for example, an operator's operation input, outputs any of various types of operations, such as flow rate measurement, conductivity measurement, and nil-state determination, to the computing circuit 27, and displays, for example, the flow rate measurement result or the nil-state determination result output from the computing circuit 27 using a display circuit, such as a light emitting diode (LED) or a liquid crystal display (LCD).

The computing circuit 27 includes a CPU and its peripheral circuits. By causing the CPU to execute a predetermined program, the computing circuit 27 implements the functions of various processing units, such as the excitation control unit 27A and the flow-rate calculating unit 27B, using hardware in conjunction with software.

(Configuration of Detecting Unit)

Figure 3:
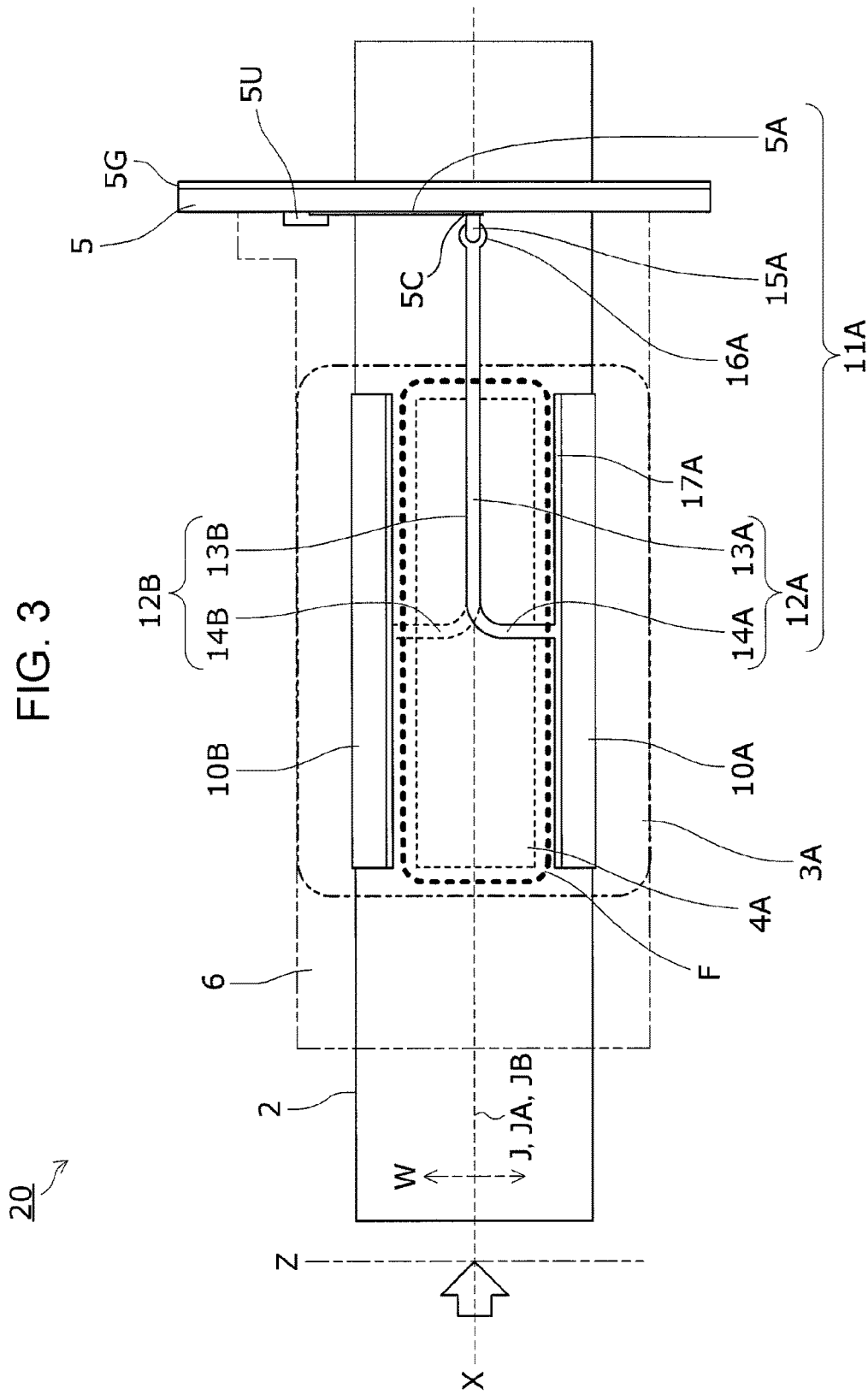
FIG. 3 is a side view of the detecting unit according to the first embodiment.
Figure 4:
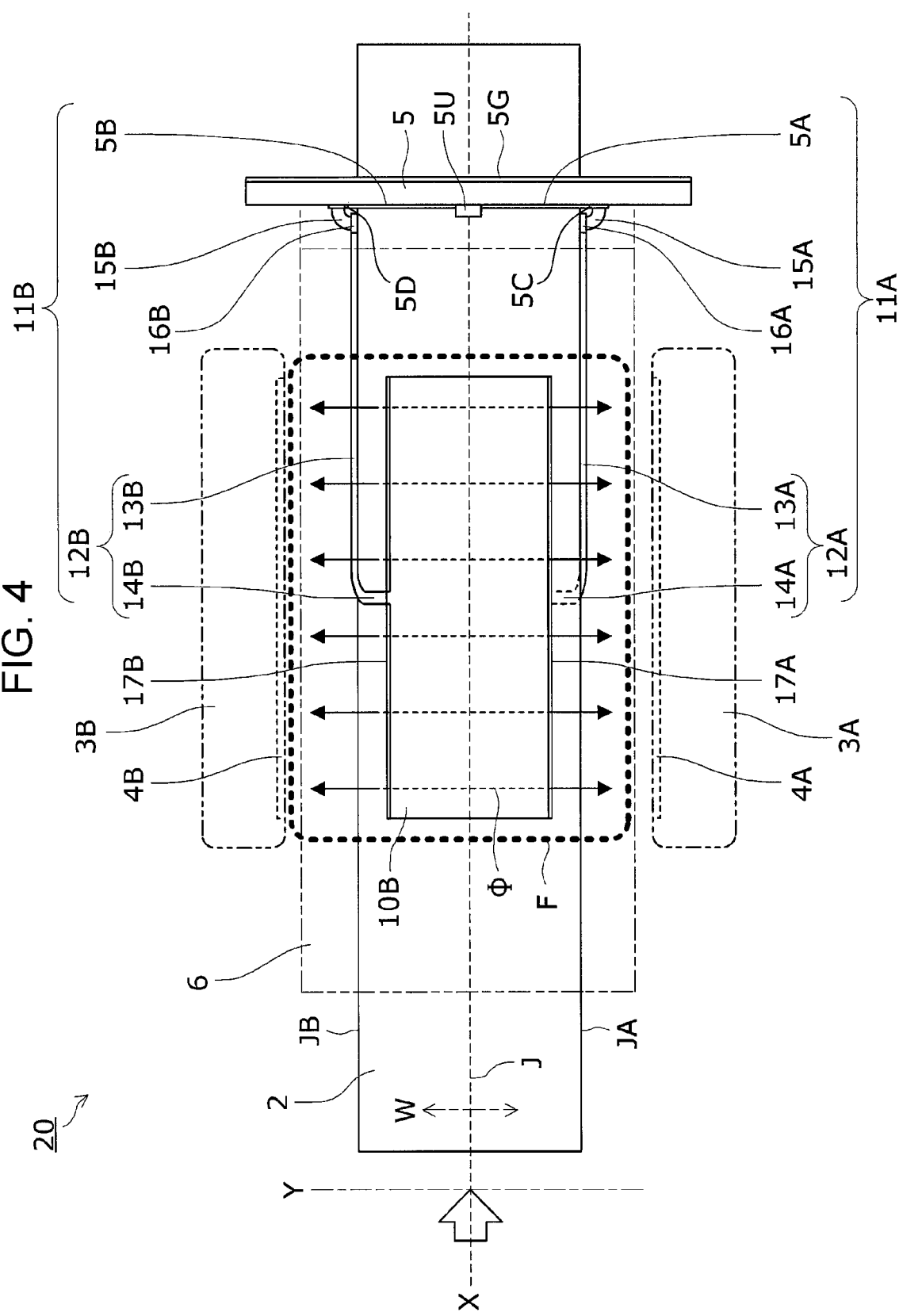
FIG. 4 is a top view of the detecting unit according to the first embodiment.
Figure 5:
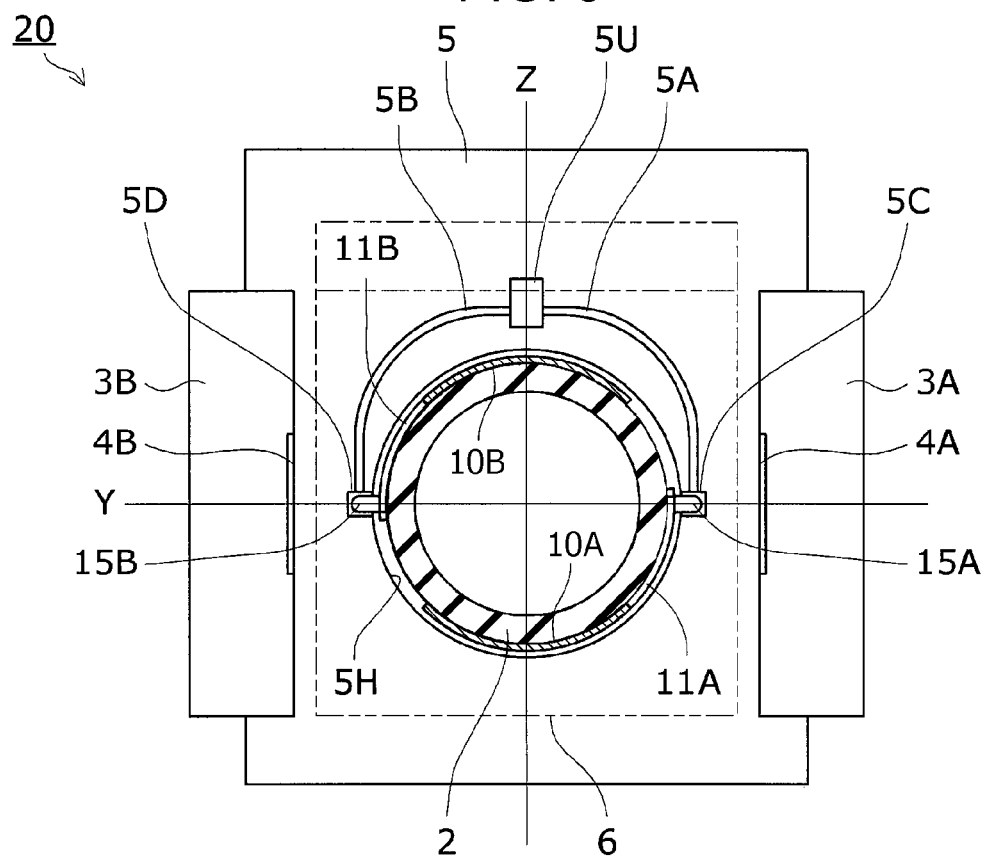
FIG. 5 is a front view of the detecting unit according to the first embodiment.

A configuration of the detecting unit 20 will now be described in detail with reference to FIG. 1 and FIGS. 3 to 5. FIG. 3 is a side view of a detecting unit according to the first embodiment. FIG. 4 is a top view of the detecting unit according to the first embodiment. FIG. 5 is a front view of the detecting unit according to the first embodiment.

Figure 16:
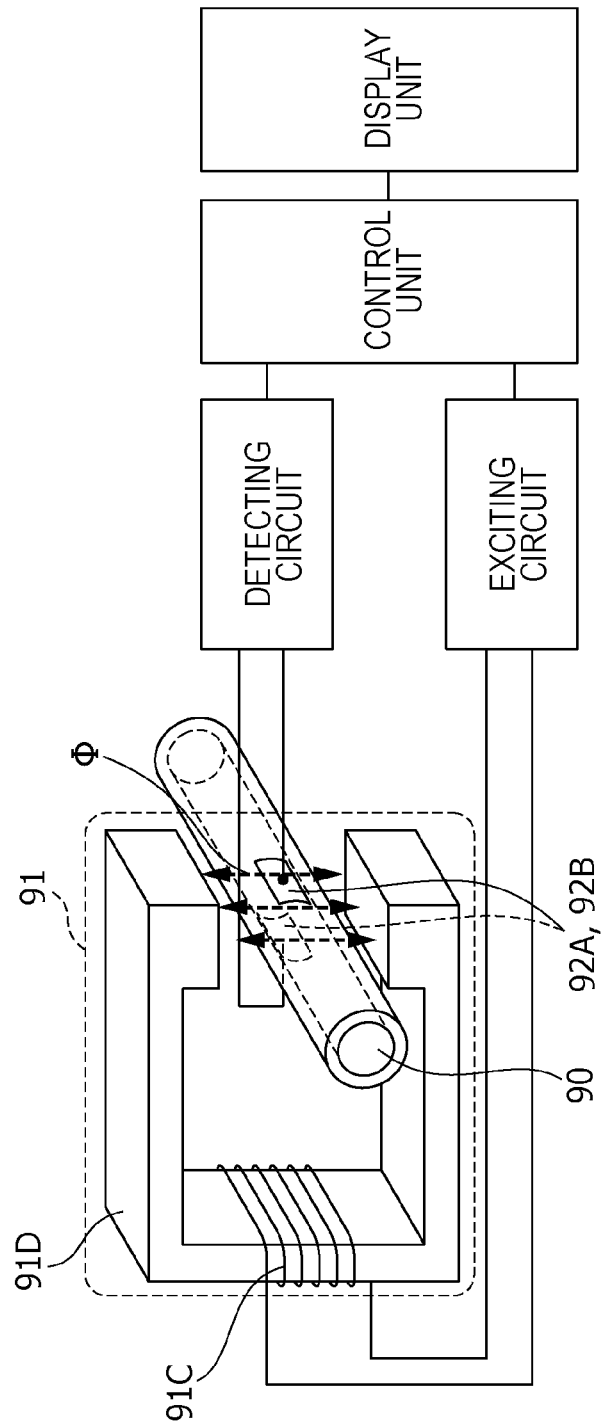
FIG. 16 illustrates a circuit configuration of a typical capacitive electromagnetic flowmeter.
Figure 17:
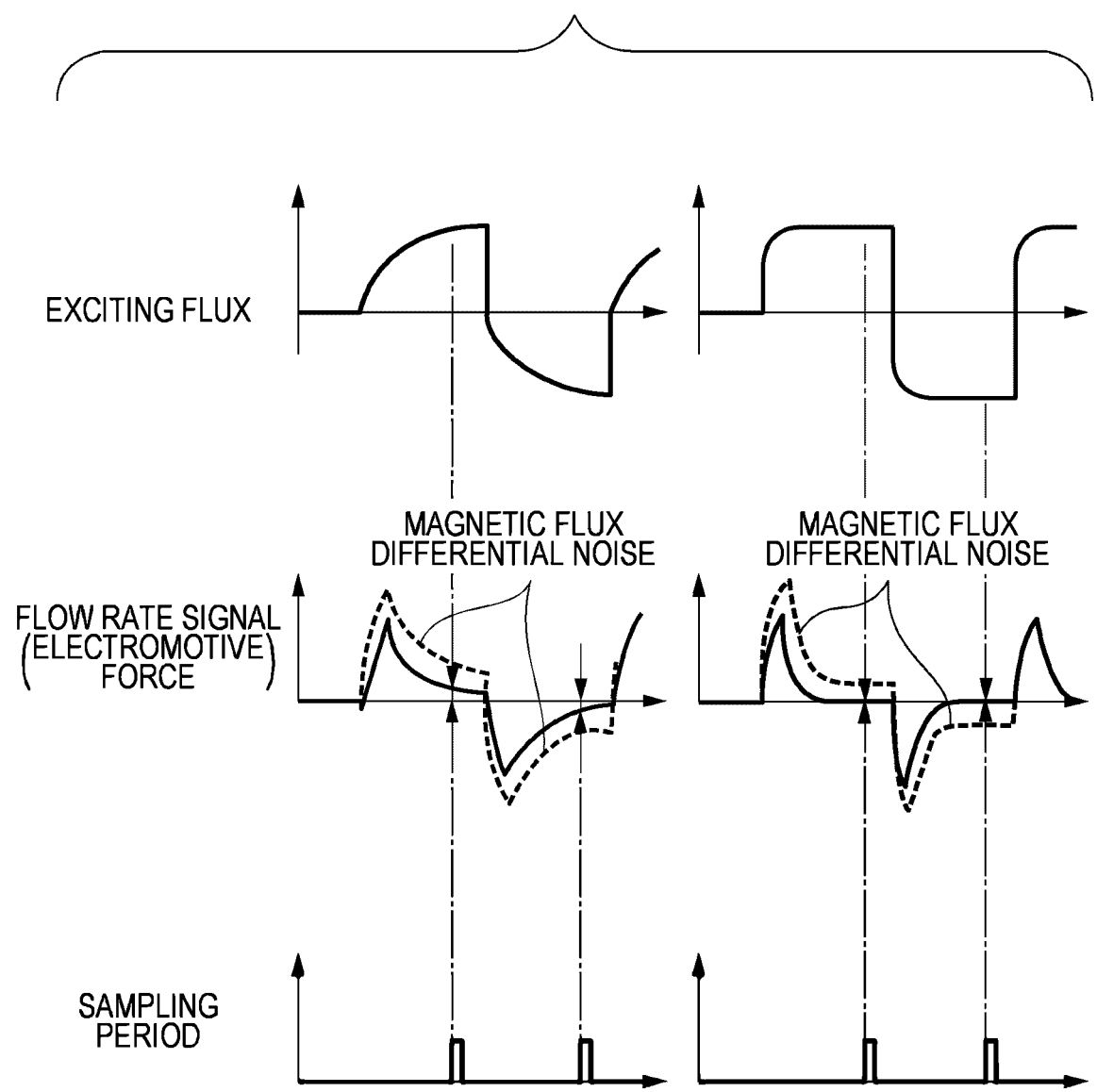
FIG. 17 shows waveforms of magnetic flux differential noise.

As illustrated in FIG. 1, the measuring tube 2 is a cylindrical member made of a material with high insulation and dielectric properties, such as ceramic or resin. A substantially C-shaped yoke (e.g., a yoke having the same shape as the yoke 91D in FIG. 16) and the exciting coils 3A and 3B forming a pair are disposed outside the measuring tube 2 such that a magnetic flux direction (second direction) Y is orthogonal to a longitudinal direction (first direction) X of the measuring tube 2. Specifically, end faces of the yoke are disposed opposite each other, with the measuring tube 2 therebetween, and the exciting coils 3A and 3B are also disposed opposite each other, with the measuring tube 2 therebetween. For better visibility, only the end faces of the yoke opposite each other, that is, yoke surfaces 4A and 4B, are shown in FIG. 1 and FIGS. 3 to 5. The surface electrode (first surface electrode) 10A and the surface electrode (second surface electrode) 10B, which are thin-film conductors forming a pair, are disposed on an outer periphery 2A of the measuring tube 2 such that they are opposite each other in an electrode direction (third direction) Z orthogonal to both the longitudinal direction X and the magnetic flux direction Y.

When the alternating exciting current Iex is supplied to the exciting coils 3A and 3B, the magnetic flux Φ is generated between the yoke surfaces 4A and 4B located in the respective centers of the exciting coils 3A and 3B. Then, in the fluid flowing through the flow path 1, alternating electromotive force having an amplitude proportional to the flow velocity of the fluid is generated along the electrode direction Z. The surface electrodes 10A and 10B detect this electromotive force using the capacitance between the fluid and the surface electrodes 10A and 10B.

The capacitance is as small as several pF. This increases impedance between the fluid and the surface electrodes 10A and 10B, and leads to increased susceptibility to noise. Therefore, the electromotive forces Va and Vb obtained by the surface electrodes 10A and 10B are converted to low-impedance signals by the preamplifier 5U which uses, for example, an operational amplifier integrated circuit (IC).

In the present embodiment, as illustrated in FIG. 1, a preamplifier substrate 5 is attached to the measuring tube 2 in such a manner that it extends in a direction intersecting the measuring tube 2 and that it is located outside a flux region F where the magnetic flux Φ is generated between the yoke surfaces 4A and 4B on the exciting coils 3A and 3B. The preamplifier 5U is mounted on the preamplifier substrate 5 and electrically connected to the surface electrodes 10A and 10B by a connection line (first connection line) 11A and a connection line (second connection line) 11B.

The preamplifier substrate 5 is a printed circuit board typically used to mount electronic components. As illustrated in FIG. 5, the preamplifier substrate 5 has a tube hole 5H, in a substantially central position thereof, to allow the measuring tube 2 to pass therethrough. This means that the preamplifier substrate 5 is attached to the measuring tube 2 so as to extend along a direction intersecting the measuring tube 2. The preamplifier substrate 5 can be easily attached to the measuring tube 2 by securing the edge of the tube hole 5H with an adhesive to the outer periphery 2A of the measuring tube 2 passing through the tube hole 5H. Although the tube hole 5H does not open toward the edge of the preamplifier substrate 5 in the example illustrated in FIG. 5, part of the perimeter of the tube hole 5H may directly open toward the edge of the preamplifier substrate 5, or may indirectly open through a slit.

In the example illustrated in FIGS. 3 and 4, the preamplifier substrate 5 is attached to the measuring tube 2 at a position spaced from the flux region F in the downstream direction of the fluid flowing in the longitudinal direction X (indicated by arrow). At the same time, as described above, the preamplifier substrate 5 is attached to the measuring tube 2 so as to extend in the direction in which the surface thereof intersects the measuring tube 2, or in the direction along the two-dimensional plane defined by the magnetic flux direction Y and the electrode direction Z in this example. The preamplifier substrate 5 may be attached at any position outside the flux region F, and may be spaced in the upstream direction (opposite the downstream direction) from the flux region F. The direction in which the preamplifier substrate 5 extends is not exclusively limited to the direction along the two-dimensional plane described above, and the preamplifier substrate 5 may extend at an angle with respect to the two-dimensional plane.

The surface electrodes 10A and 10B, the connection lines 11A and 11B, and the preamplifier 5U are electrically shielded by a shielding case 6 made of a metal plate and connected to the ground potential. The shielding case 6 is a substantially rectangular member extending along the longitudinal direction X. The shielding case 6 has openings, at positions upstream and downstream of the flux region F, to allow the measuring tube 2 to pass through the interior of the shielding case 6.

The effect of external noise is thus reduced by shielding the entire circuit part, which has high impedance, with the shielding case 6. The solder surface of the preamplifier substrate 5, which is opposite the surface where preamplifier 5U is mounted, may be provided with a shielding pattern 5G formed thereon by a ground pattern (solid pattern) and connected to the ground potential. This allows part of the flat surface of the shielding case 6 abutting against the preamplifier substrate 5 to be completely open, and thus simplifies the structure of the shielding case 6.

The connection lines 11A and 11B, which connect the surface electrodes 10A and 10B to the preamplifier 5U, may be a pair of wiring cables typically used, because the connection lines 11A and 11B are entirely shielded by the shielding case 6, as described above. When wiring cables are used as the connection lines 11A and 11B, they may be soldered, at both ends thereof, to corresponding pads formed on the surface electrodes 10A and 10B and the preamplifier substrate 5.

In the present embodiment, as illustrated in FIGS. 3 and 4, tube-side wiring patterns 12A and 12B formed on the outer periphery 2A of the measuring tube 2 are used as part of the connection lines 11A and 11B.

Specifically, the connection line 11A includes the tube-side wiring pattern (first tube-side wiring pattern) 12A formed on the outer periphery 2A and connected at one end thereof to the surface electrode 10A, a substrate-side wiring pattern (first substrate-side wiring pattern) 5A formed on the preamplifier substrate 5 and connected at one end thereof to the preamplifier 5U, and a jumper wire (first jumper wire) 15A connecting the tube-side wiring pattern 12A to the substrate-side wiring pattern 5A. The jumper wire 15A is soldered to a pad 16A formed at the other end of the tube-side wiring pattern 12A and is also soldered to a pad 5C formed at the other end of the substrate-side wiring pattern 5A.

Similarly, the connection line 11B includes the tube-side wiring pattern (second tube-side wiring pattern) 12B formed on the outer periphery 2A and connected at one end thereof to the surface electrode 10B, a substrate-side wiring pattern (second substrate-side wiring pattern) 5B formed on the preamplifier substrate 5 and connected at one end thereof to the preamplifier 5U, and a jumper wire (second jumper wire) 15B connecting the tube-side wiring pattern 12B to the substrate-side wiring pattern 5B. The jumper wire 15B is soldered to a pad 16B formed at the other end of the tube-side wiring pattern 12B and is also soldered to a pad 5D formed at the other end of the substrate-side wiring pattern 5B.

Thus, in a section of the connection lines 11A and 11B, ranging from the surface electrodes 10A and 10B to the vicinity of the preamplifier substrate 5, the tube-side wiring patterns 12A and 12B formed on the outer periphery 2A are used. Therefore, as compared to the aforementioned case of using a pair of wiring cables, the installation, including routing and securing, of the connection lines 11A and 11B is simpler, the wiring materials are less costly, and the wiring is easier.

The surface electrodes 10A and 10B and the tube-side wiring patterns 12A and 12B are made of nonmagnetic metal thin films, such as copper thin films, and integrally formed by metallizing the outer periphery 2A of the measuring tube 2. This simplifies the manufacturing process and leads to reduced product cost. The metallizing, described above, may be plating or evaporation, or may be application of nonmagnetic metal thin films formed in advance.

As illustrated in FIGS. 3 and 4, the tube-side wiring pattern 12A includes a longitudinal wiring pattern (first longitudinal wiring pattern) 13A linearly formed on the outer periphery 2A of the measuring tube 2 along the longitudinal direction X. Similarly, the tube-side wiring pattern 12B includes a longitudinal wiring pattern (second longitudinal wiring pattern) 13B linearly formed on the outer periphery 2A of the measuring tube 2 along the longitudinal direction X.

Figure 18:
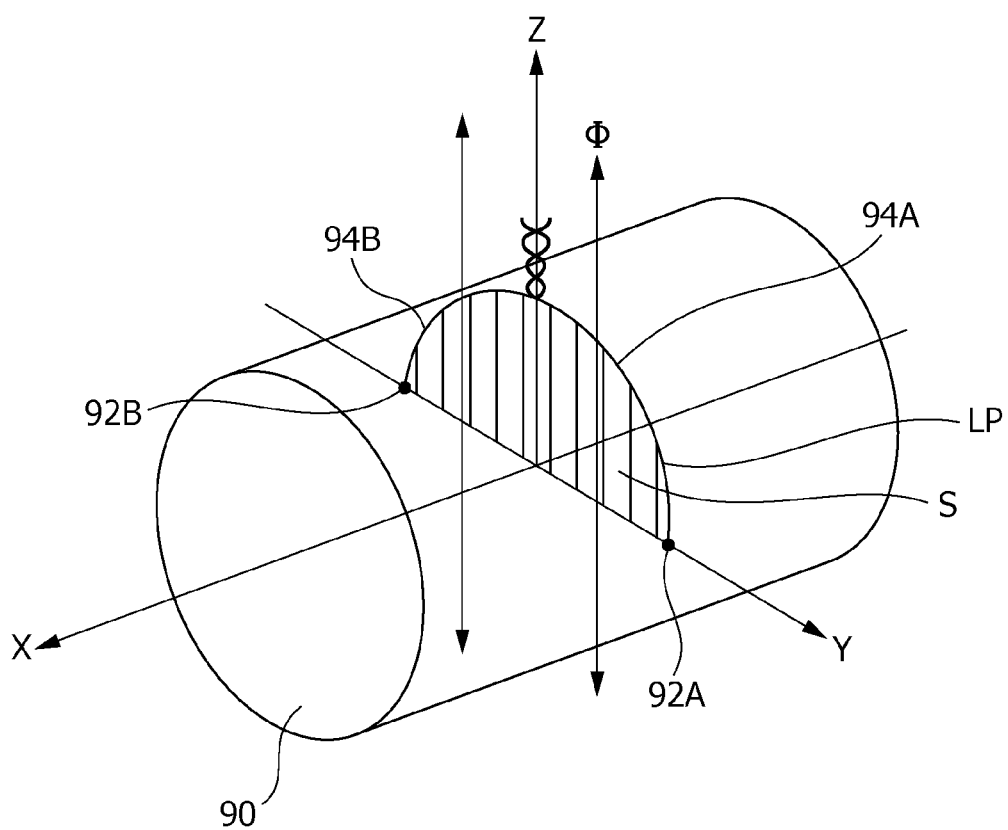
FIG. 18 is an explanatory diagram illustrating the occurrence of magnetic flux differential noise in shielded lines.

The connection lines 11A and 11B are partially disposed inside or near the flux region F. Therefore, if a pair of wiring cables is used as the connection lines 11A and 11B, a positional displacement between the two lines, as viewed in the magnetic flux direction Y, creates a signal loop, such as that illustrated in FIG. 18, and this leads to the occurrence of magnetic flux differential noise. When, as in the present embodiment, wiring patterns formed on the outer periphery 2A of the measuring tube 2 are used, the connection lines 11A and 11B are accurately secured in place. This prevents positional displacement between the two lines as viewed in the magnetic flux direction Y, and facilitates reduction of magnetic flux differential noise.

Also, as illustrated in FIGS. 3 and 4, the tube-side wiring pattern 12A further includes a circumferential wiring pattern (first circumferential wiring pattern) 14A formed on the outer periphery 2A of the measuring tube 2 along a circumferential direction W of the measuring tube 2. Specifically, the circumferential wiring pattern 14A extends from a first edge 17A of the surface electrode 10A, which is along the longitudinal direction X, to one end of the longitudinal wiring pattern 13A.

Similarly, the tube-side wiring pattern 12B further includes a circumferential wiring pattern (second circumferential wiring pattern) 14B formed on the outer periphery 2A of the measuring tube 2 along the circumferential direction W of the measuring tube 2. Specifically, the circumferential wiring pattern 14B extends from a second edge 17B of the surface electrode 10B, which is along the longitudinal direction X, to one end of the longitudinal wiring pattern 13B.

The longitudinal wiring patterns 13A and 13B are disposed on opposite sides of the outer periphery 2A, with the measuring tube 2 therebetween, so as to coincide with each other as viewed in the magnetic flux direction Y. That is, the longitudinal wiring patterns 13A and 13B are formed on the outer periphery 2A at positions symmetrical with respect to a plane extending along the electrode direction Z across a tube axis J.

In the example illustrated in FIGS. 3 and 4, the longitudinal wiring patterns 13A and 13B are formed on intersection lines JA and JB, respectively, where a plane extending along the magnetic flux direction Y across the tube axis J of the measuring tube 2 intersects the outer periphery 2A. The circumferential wiring pattern 14A is connected at one end thereof to the first edge 17A of the surface electrode 10A at the center of the surface electrode 10A in the longitudinal direction X. Similarly, the circumferential wiring pattern 14B is connected at one end thereof to the second edge 17B of the surface electrode 10B at the center of the surface electrode 10B in the longitudinal direction X.

The longitudinal wiring patterns 13A and 13B are thus formed to coincide with each other as viewed in the magnetic flux direction Y. Therefore, it is possible to reliably avoid formation of a signal loop, such as that shown in FIG. 18, and easily reduce the occurrence of magnetic flux differential noise.

The points at which the circumferential wiring patterns 14A and 14B are connected to the surface electrodes 10A and 10B, respectively, do not necessarily need to be the centers of the surface electrodes 10A and 10B, as long as they are symmetric with respect to the tube axis J, that is, as long as they are at the same position in the longitudinal direction X of the surface electrodes 10A and 10B.

Forming the longitudinal wiring patterns 13A and 13B on the intersection lines JA and JB, respectively, makes the lengths of the circumferential wiring patterns 14A and 14B equal, and makes the overall lengths of the tube-side wiring patterns 12A and 12B equal. This reduces imbalance in phase difference, amplitude, and the like between the electromotive forces Va and Vb from the surface electrodes 10A and 10B, caused by a difference in length between the tube-side wiring patterns 12A and 12B. As long as the imbalance is negligible in terms of measurement accuracy, the longitudinal wiring patterns 13A and 13B do not necessarily need to be on the intersection lines JA and JB, and may be formed at any positions that coincide with each other as viewed in the magnetic flux direction Y.

Figure 6:
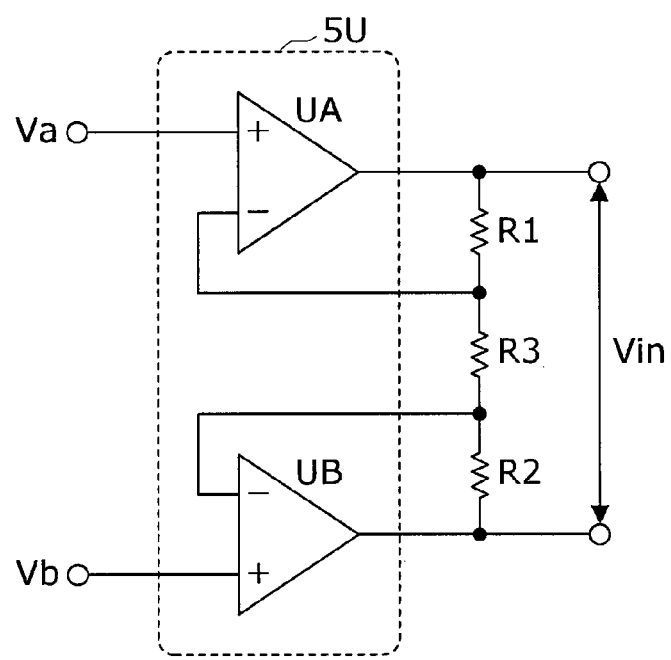
FIG. 6 illustrates a configuration of a differential amplifier circuit using a preamplifier.

FIG. 6 illustrates a configuration of a differential amplifier circuit using a preamplifier. As illustrated in FIG. 6, the preamplifier 5U includes two operational amplifiers UA and UB, by which the electromotive forces Va and Vb from the surface electrodes 10A and 10B are individually converted to, and output as, low-impedance signals. The operational amplifiers UA and UB are encapsulated in the same IC package to form a dual operational amplifier. The operational amplifiers UA and UB differentially amplify the input electromotive forces Va and Vb and output the resulting differential output as the detection signal Vin to the signal amplifying circuit 21 (see FIG. 2).

Specifically, the electromotive force Va is input to the non-inverting input terminal (+) of the operational amplifier UA, and the electromotive force Vb is input to the non-inverting input terminal (+) of the operational amplifier UB. The inverting input terminal (−) of the operational amplifier UA is connected through a resistance element R1 to the output terminal of the operational amplifier UA, and the inverting input terminal (−) of the operational amplifier UB is connected through a resistance element R2 to the output terminal of the operational amplifier UB. The inverting input terminal (−) of the operational amplifier UA is connected through a resistance element R3 to the inverting input terminal (−) of the operational amplifier UB. The amplification factors of the operational amplifiers UA and UB are made equal by making the values of the resistance elements R1 and R2 equal. The amplification factors are determined by the values of the resistance elements R1 and R2 and the value of the resistance element R3.

The electromotive forces Va and Vb from the surface electrodes 10A and 10B are signals of opposite phases. With this configuration in which a differential amplifier circuit is formed on the preamplifier substrate 5 using the operational amplifiers UA and UB, even if temperature drifts appear in the electromotive forces Va and Vb due to the effect of heat from the exciting coils 3A and 3B and the measuring tube 2, the electromotive forces Va and Vb are differentially amplified by the differential amplifier circuit. Thus, the temperature drifts of the same phase in the detection signal Vin are cancelled, and a good signal-to-noise (S/N) ratio is achieved by addition of the electromotive forces Va and Vb.

(Advantageous Effects of First Embodiment)

In the present embodiment, the preamplifier substrate 5 on which the preamplifier 5U is mounted, the preamplifier 5U being configured to amplify electromotive forces detected by the surface electrodes 10A and 10B, is disposed outside the flux region F where the magnetic flux Φ is produced, and the preamplifier substrate 5 extends in a direction intersecting the measuring tube 2.

Thus, since the preamplifier substrate 5 is disposed at a distance from the exciting coils 3A and 3B, the effect of heat generated by the exciting coils 3A and 3B is significantly reduced.

The preamplifier substrate 5 is attached to the measuring tube 2 so as to extend in a direction intersecting the measuring tube 2. Therefore, the effect of radiant heat from the fluid flowing in the measuring tube 2 is much smaller than when the preamplifier substrate 5 is attached to the measuring tube 2 so as to extend along the outer periphery 2A of the measuring tube 2.

This reduces temperature drift in the preamplifier 5U caused by the thermal effect, and enables highly accurate measurement of the flow rate.

Since the preamplifier substrate 5 is disposed at a distance from the exciting coils 3A and 3B, it is possible to reduce magnetic flux differential noise produced as the magnetic flux Φ passes across the wiring patterns on the preamplifier substrate 5. In particular, when the preamplifier substrate 5 is attached to extend in a direction along the magnetic flux direction Y, the wiring patterns on the preamplifier substrate 5 are substantially parallel to the magnetic flux Φ. Therefore, the cross-sectional area of a signal loop formed by the wiring patterns, as viewed in the magnetic flux direction Y, can be made extremely small, and this significantly reduces magnetic flux differential noise.

In the present embodiment, the preamplifier substrate 5 may have the tube hole 5H that allows the measuring tube 2 to entirely or partially pass therethrough.

This allows the preamplifier substrate 5 to be easily attached so as to extend in a direction intersecting the measuring tube 2. The preamplifier substrate 5 can be easily attached to the measuring tube 2 using an adhesive or the like, and thus the configuration required for attaching the preamplifier substrate 5 is simplified. Also, by allowing the measuring tube 2 to pass through the tube hole 5H, the preamplifier substrate 5 can be attached to the measuring tube 2 so as to extend in a direction intersecting the measuring tube 2 without requiring much space. It is thus possible to provide a compact capacitive electromagnetic flowmeter that meets the demands of the FA market.

In the present embodiment, the shielding case 6 may shield the surface electrodes 10A and 10B, the connection lines 11A and 11B, and the preamplifier 5U.

This reduces the effect of external noise because the circuit part, which has high impedance, is entirely shielded by the shielding case 6.

In the present embodiment, the preamplifier substrate 5 may have a shielding pattern (ground pattern), which is formed by a ground plane connected to the ground potential, at least in a region abutting against the shielding case 6.

This allows a surface of the shielding case 6 abutting against the preamplifier substrate 5 to open, and simplifies the structure of the shielding case 6.

In the present embodiment, the connection line 11A may include the tube-side wiring pattern 12A formed on the outer periphery 2A and connected at one end thereof to the surface electrode 10A, the substrate-side wiring pattern 5A formed on the preamplifier substrate 5 and connected at one end thereof to the preamplifier 5U, and the jumper wire 15A connecting the other end of the tube-side wiring pattern 12A to the other end of the substrate-side wiring pattern 5A.

Similarly, the connection line 11B may include the tube-side wiring pattern 12B formed on the outer periphery 2A and connected at one end thereof to the surface electrode 10B, the substrate-side wiring pattern 5B formed on the preamplifier substrate 5 and connected at one end thereof to the preamplifier 5U, and the jumper wire 15B connecting the other end of the tube-side wiring pattern 12B to the other end of the substrate-side wiring pattern 5B.

Thus, in a section of the connection lines 11A and 11B, ranging from the surface electrodes 10A and 10B to the vicinity of the preamplifier substrate 5, the tube-side wiring patterns 12A and 12B formed on the outer periphery 2A are used. Therefore, as compared to the aforementioned case of using a pair of wiring cables, the installation, including routing and securing, of the connection lines 11A and 11B is simpler.

In the present embodiment, the tube-side wiring pattern 12A may include the longitudinal wiring pattern 13A extending from the vicinity of the preamplifier substrate 5 toward the flux region F along the longitudinal direction X, and the circumferential wiring pattern 14A extending from the end point of the longitudinal wiring pattern 13A to the surface electrode 10A along the circumferential direction W of the measuring tube 2.

Similarly, the tube-side wiring pattern 12B may include the longitudinal wiring pattern 13B extending from the vicinity of the preamplifier substrate 5 toward the flux region F along the longitudinal direction X, so as to coincide with the longitudinal wiring pattern 13A as viewed in the magnetic flux direction Y, and the circumferential wiring pattern 14B extending from the end point of the longitudinal wiring pattern 13B to the surface electrode 10B along the circumferential direction W of the measuring tube 2.

The longitudinal wiring patterns 13A and 13B are thus formed to coincide with each other as viewed in the magnetic flux direction Y. Therefore, it is possible to reliably avoid formation of a signal loop, such as that shown in FIG. 18, and easily reduce the occurrence of magnetic flux differential noise.

Second Embodiment

Figure 7:
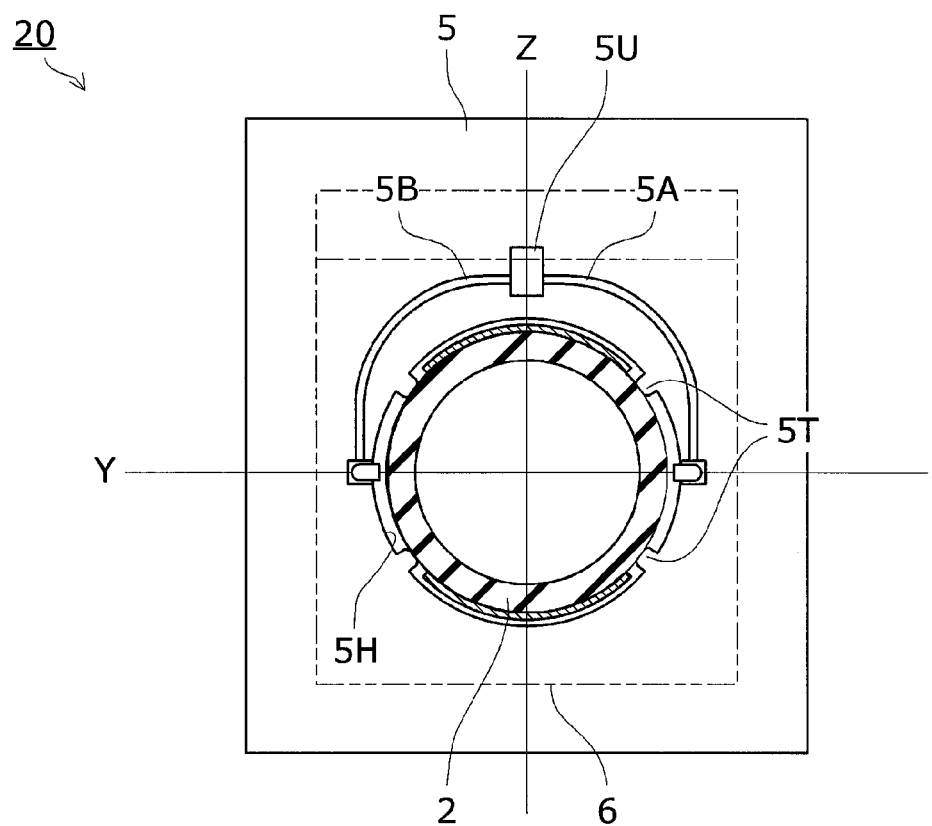
FIG. 7 is a front view of a detecting unit according to a second embodiment.

A capacitive electromagnetic flowmeter according to a second embodiment of the present disclosure will now be described with reference to FIG. 7. FIG. 7 is a front view of a detecting unit according to the second embodiment.

In the first embodiment, the preamplifier substrate 5 is attached to the measuring tube 2 by securing the edge of the tube hole 5H, with an adhesive, to the outer periphery 2A of the measuring tube 2 passing through the tube hole 5H. In the present embodiment, the preamplifier substrate 5 is attached to the measuring tube 2 by pressing the edge of the tube hole 5H into contact with the outer periphery 2A of the measuring tube 2.

As illustrated in FIG. 7, the preamplifier substrate 5 of the present embodiment has a plurality of protrusions 5T along the perimeter of the tube hole 5H and allows the protrusions 5T to abut against the outer periphery 2A. This means that the edge of the tube hole 5H only partially comes into contact with the outer periphery 2A. Therefore, as compared to the configuration in which the edge of the tube hole 5H is in contact with the outer periphery 2A throughout the circumference of the tube hole 5H, the effect of heat transferred from the measuring tube 2 to the preamplifier substrate 5 is smaller.

Also, when the measuring tube 2 is press-fitted into the tube hole 5H, deformation of the protrusions 5T and gaps created by the protrusions 5T between the edge of the tube hole 5H and the outer periphery 2A facilitate press-fitting of the measuring tube 2. This eliminates the need for a special jig for press fitting and eases the workload.

Press-fitting the measuring tube 2 into the tube hole 5H facilitates securing of the preamplifier substrate 5 in place, and eases the soldering of the jumper wires 15A and 15B to the tube-side wiring patterns 12A and 12B and the substrate-side wiring patterns 5A and 5B.

Third Embodiment

Figure 8:
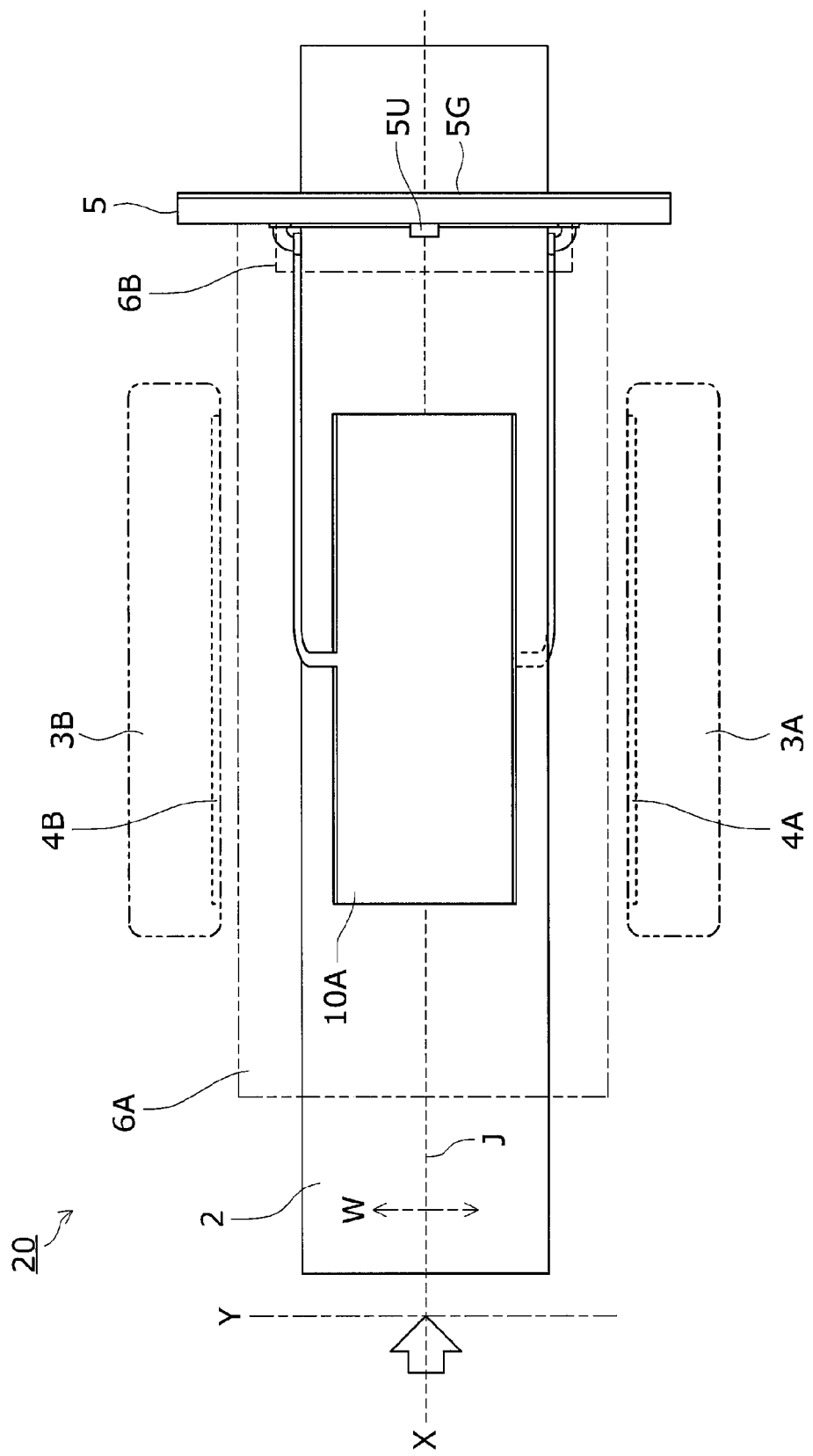
FIG. 8 is a top view of a detecting unit according to a third embodiment.
Figure 9:
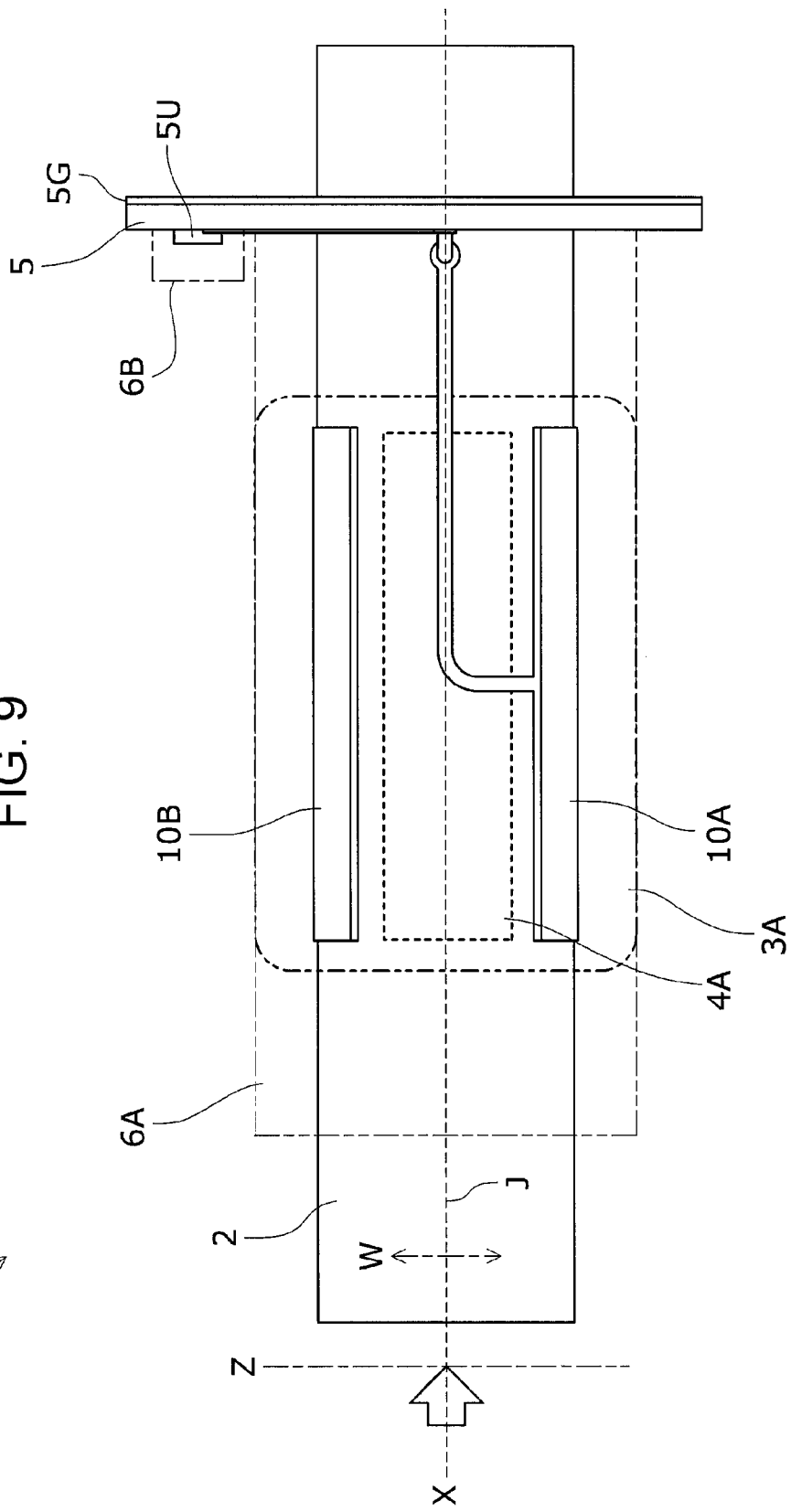
FIG. 9 is a side view of the detecting unit according to the third embodiment.
Figure 10:
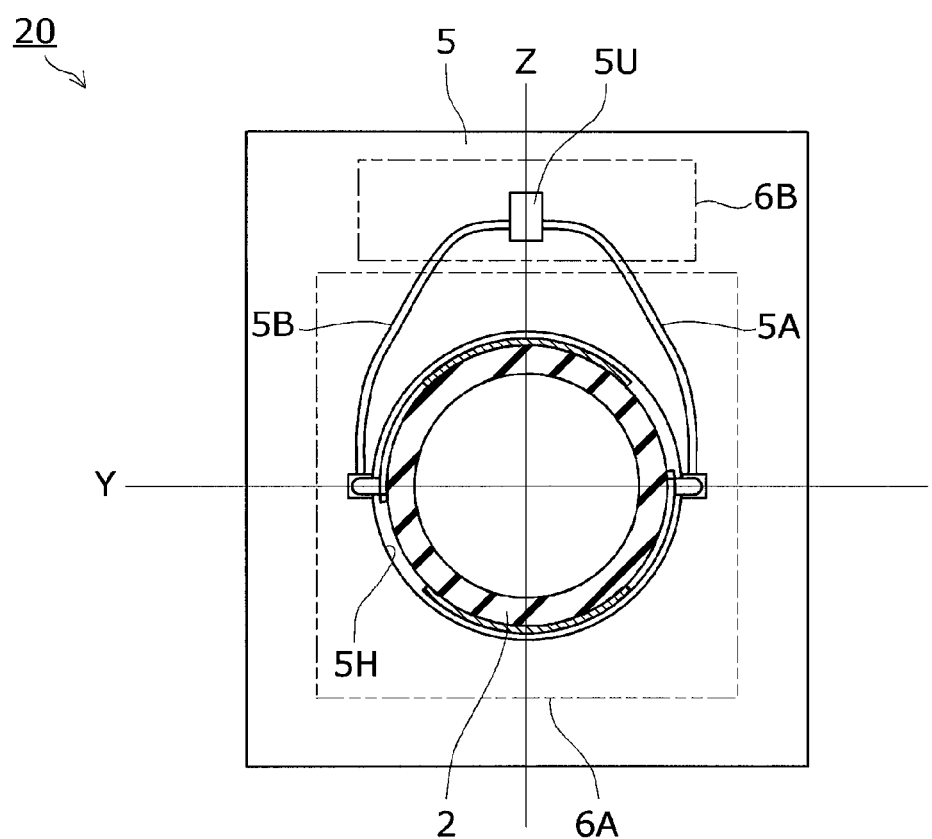
FIG. 10 is a front view of the detecting unit according to the third embodiment.
Figure 11:
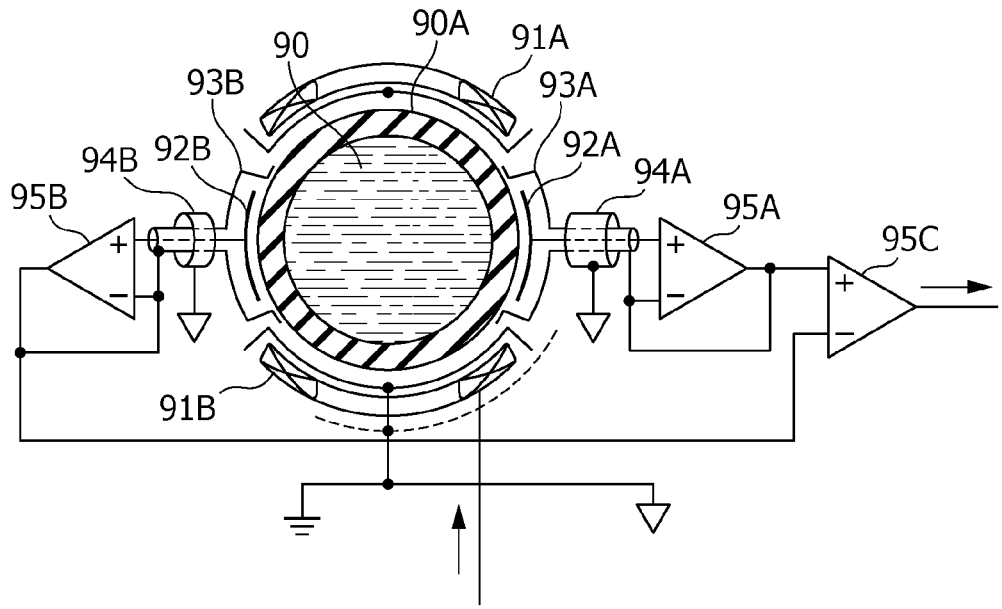
FIG. 11 illustrates a circuit configuration of a capacitive electromagnetic flowmeter according to the related art.
Figure 12:
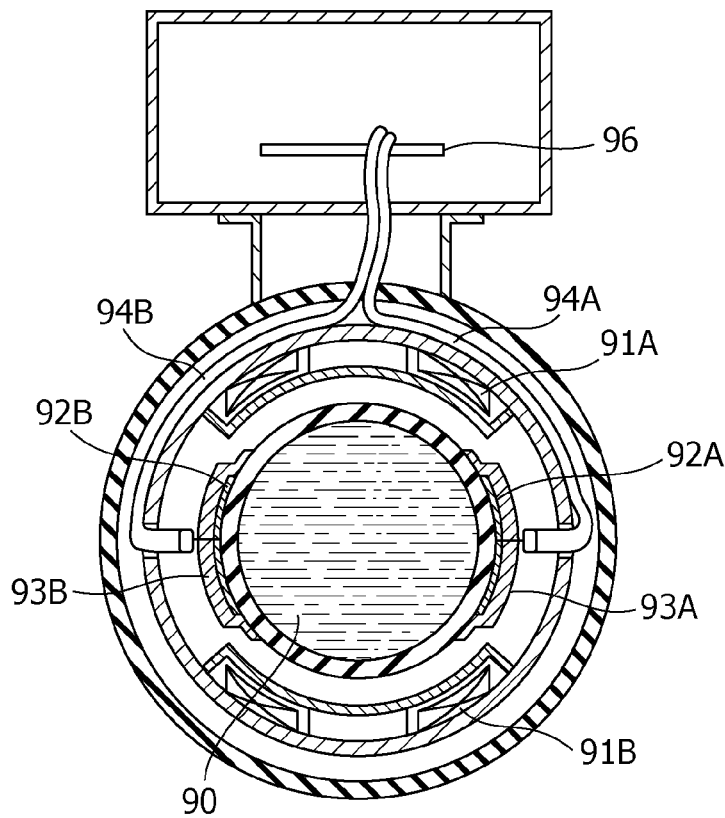
FIG. 12 illustrates a structure of the capacitive electromagnetic flowmeter according to the related art.
Figure 13:
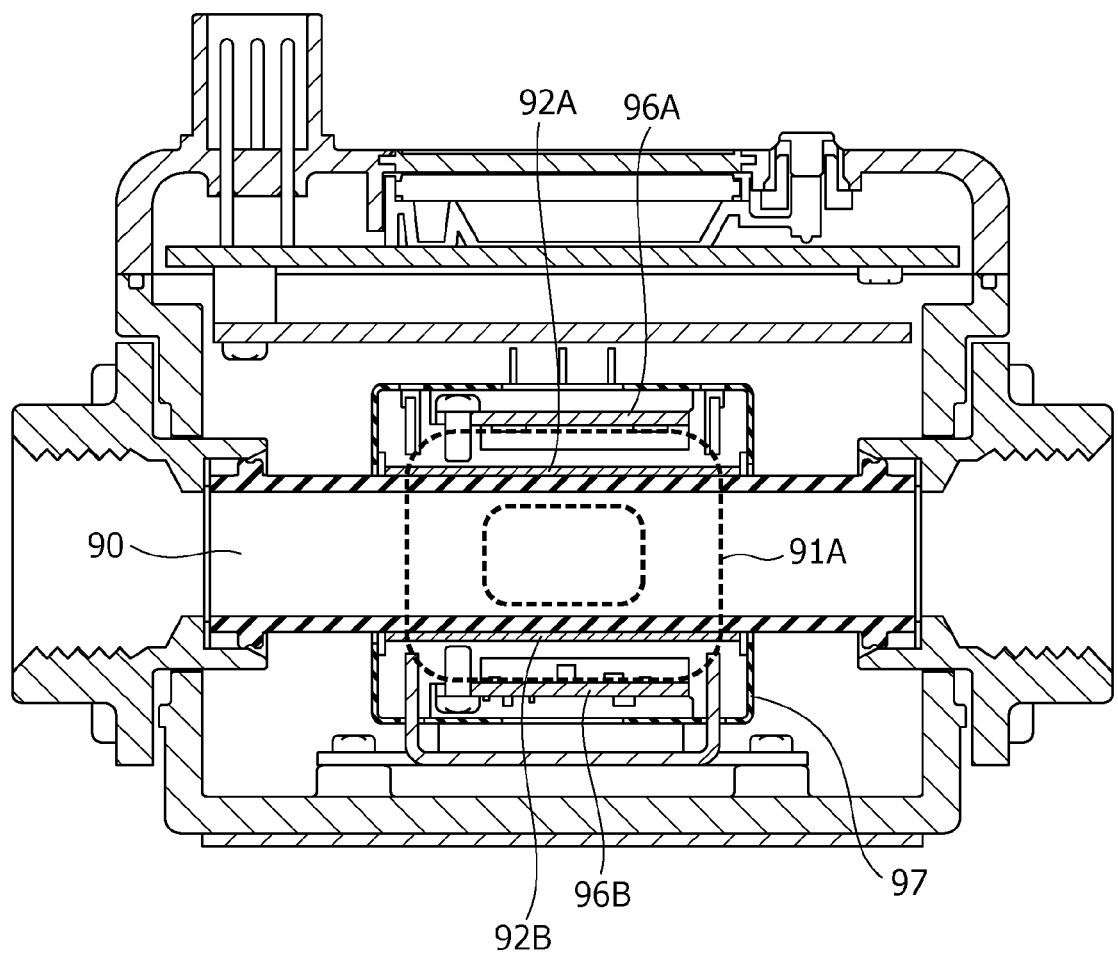
FIG. 13 is a cross-sectional view of a structure of another capacitive electromagnetic flowmeter according to the related art.
Figure 14:
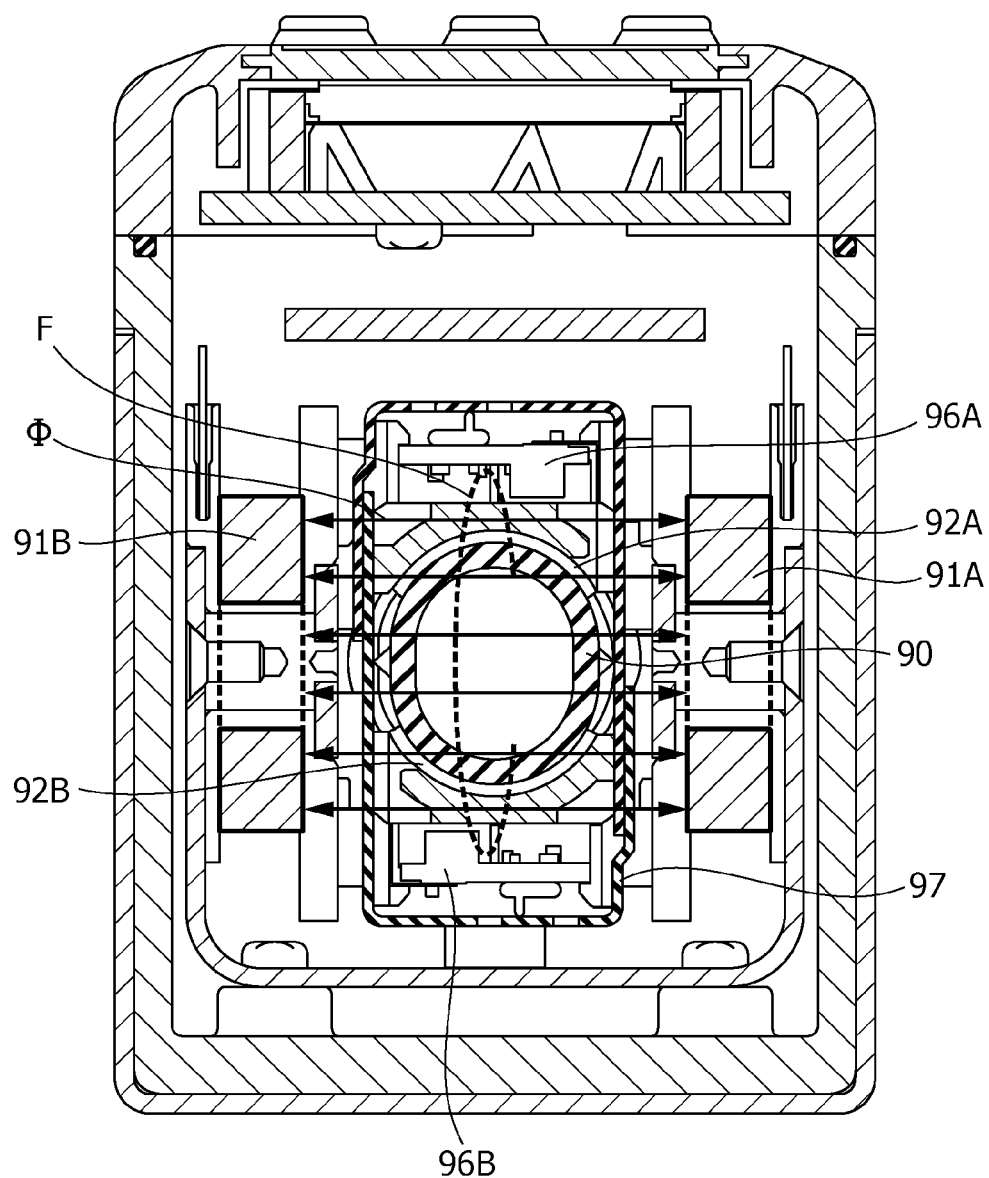
FIG. 14 is another cross-sectional view of the structure of the capacitive electromagnetic flowmeter according to the related art.
Figure 15:
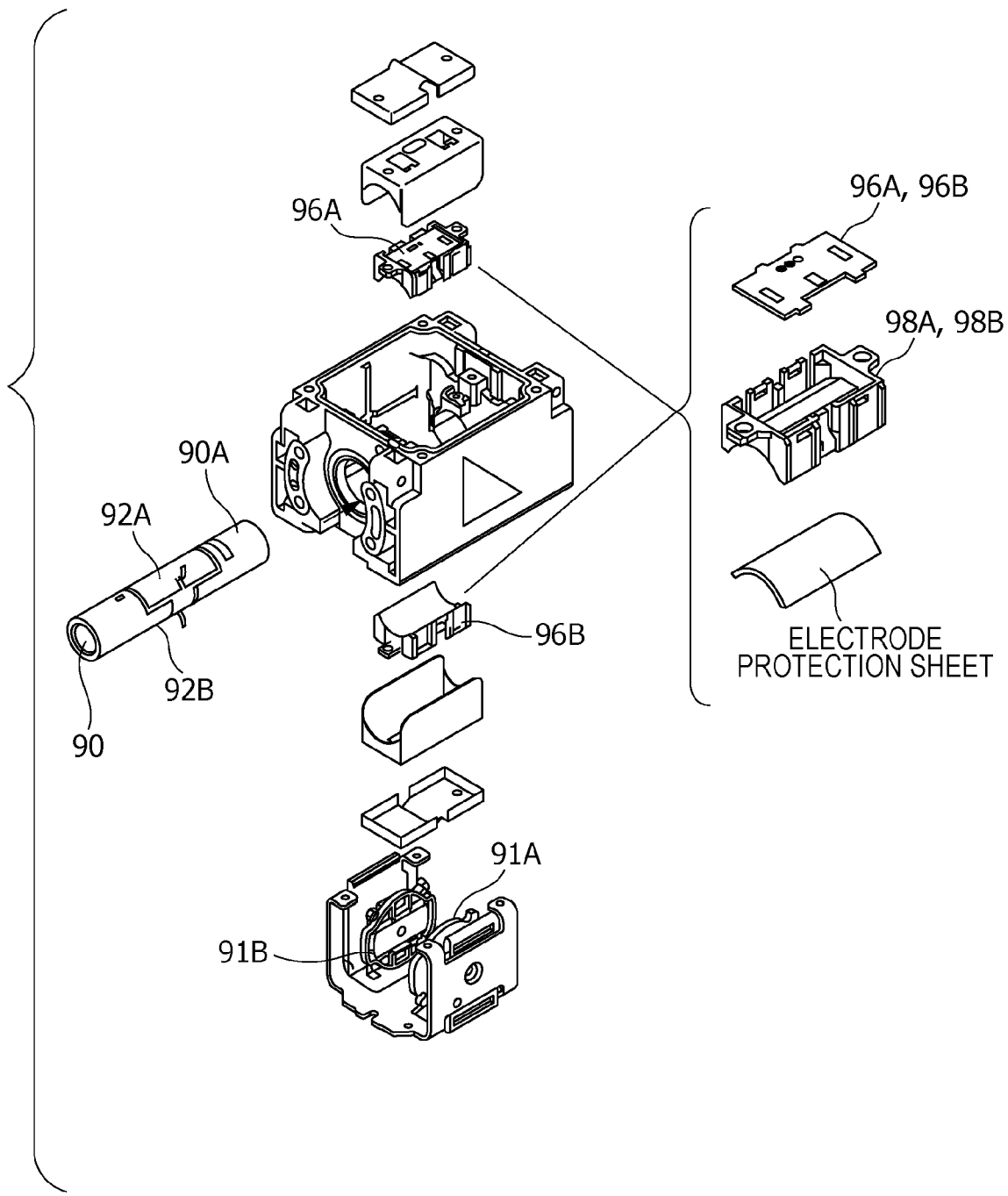
FIG. 15 is an assembly diagram of the capacitive electromagnetic flowmeter according to the related art.

The detecting unit 20 of the capacitive electromagnetic flowmeter 100 according to a third embodiment of the present disclosure will now be described with reference to FIGS. 8 to 10. FIG. 8 is a top view of a detecting unit according to the third embodiment. FIG. 9 is a side view of the detecting unit according to the third embodiment. FIG. 10 is a front view of the detecting unit according to the third embodiment.

In the first embodiment described above, the surface electrodes 10A and 10B, the connection lines 11A and 11B, and the preamplifier 5U are shielded together by one shielding case 6. In the present embodiment, however, the preamplifier 5U is shielded independently of the surface electrodes 10A and 10B and the connection lines 11A and 11B.

As illustrated in FIGS. 8 to 10, the detecting unit 20 according to the present embodiment includes two shielding cases 6A and 6B, and is configured such that the surface electrodes 10A and 10B and the connection lines 11A and 11B are shielded by the shielding case 6A and the preamplifier 5U is shielded by the shielding case 6B.

The shielding cases 6A and 6B are both made of metal plates and connected to the ground potential. The shielding case 6B corresponds to a part of the shielding case 6 (described above) for shielding the preamplifier 5U; that is, the shielding case 6B is obtained by separating this part from the other part of the shielding case 6.

As illustrated in FIG. 10, in the present embodiment, the preamplifier 5U is mounted on the preamplifier substrate 5 at a position more distant from the measuring tube 2 than in the configuration illustrated in FIG. 5. This facilitates mounting of the preamplifier 5U and further reduces the effect of heat from the measuring tube 2.

The shielding case 6A is more rectangular in shape than the shielding case 6 described above. This makes the component cost lower and the assembly easier than for the shielding case 6. The shielding case 6B can be easily mounted on the preamplifier substrate 5, and the use of a commercially available shielding case may further reduce the component cost.

Expansion of Embodiments

Although the present disclosure has been described with reference to the embodiments, the present disclosure is not limited to the embodiments described above. Various changes that will be understood by those skilled in the art may be made to the configurations and details of the present disclosure within the scope of the present disclosure. The embodiments may be appropriately carried out in combination as long as they do not conflict with each other.

What is claimed is:

1. A capacitive electromagnetic flowmeter comprising:
    a measuring tube through which a fluid to be measured flows;
    an exciting coil configured to apply a magnetic flux to the fluid along a second direction orthogonal to a first direction, the first direction being a longitudinal direction of the measuring tube;
    a pair of surface electrodes including a first surface electrode and a second surface electrode on an outer periphery of the measuring tube, the first and second electrodes being disposed opposite each other, with the measuring tube interposed therebetween, in a third direction orthogonal to the first and second directions;
    a preamplifier substrate having a preamplifier mounted thereon, the preamplifier being configured to amplify electromotive forces detected by the pair of surface electrodes; and
    a pair of connection lines including a first connection line and a second connection line configured to electrically connect the first surface electrode and the second surface electrode, respectively, to the preamplifier,
    wherein the preamplifier substrate is spaced from the exciting coil in the first direction and extends in a direction intersecting the measuring tube.

2. The capacitive electromagnetic flowmeter according to claim 1, wherein the preamplifier substrate has a tube hole that allows the measuring tube to entirely or partially pass therethrough.

3. The capacitive electromagnetic flowmeter according to claim 2, wherein the preamplifier substrate has a plurality of protrusions along a perimeter of the tube hole, the protrusions abutting against the outer periphery of the measuring tube.

4. The capacitive electromagnetic flowmeter according to claim 1, further comprising a shielding case configured to shield the pair of surface electrodes, the pair of connection lines, and the preamplifier.

5. The capacitive electromagnetic flowmeter according to claim 4, wherein the preamplifier substrate has a shielding pattern at least in a region abutting against the shielding case.

6. The capacitive electromagnetic flowmeter according to claim 4, wherein the shielding case is composed of two separate shielding cases, one being configured to shield the pair of surface electrodes and the pair of connection lines, and the other being configured to shield the preamplifier.

7. The capacitive electromagnetic flowmeter according to claim 1, wherein the first connection line includes a first tube-side wiring pattern formed on the outer periphery of the measuring tube and connected at one end thereof to the first surface electrode, a first substrate-side wiring pattern formed on the preamplifier substrate and connected at one end thereof to the preamplifier, and a first jumper wire connecting the other end of the first tube-side wiring pattern to the other end of the first substrate-side wiring pattern; and the second connection line includes a second tube-side wiring pattern formed on the outer periphery of the measuring tube and connected at one end thereof to the second surface electrode, a second substrate-side wiring pattern formed on the preamplifier substrate and connected at one end thereof to the preamplifier, and a second jumper wire connecting the other end of the second tube-side wiring pattern to the other end of the second substrate-side wiring pattern.

8. The capacitive electromagnetic flowmeter according to claim 7, wherein the measuring tube is made of ceramic; and the first and second surface electrodes and the first and second tube-side wiring patterns are made of metal thin films integrally formed by metallizing the outer periphery of the measuring tube.

9. A capacitive electromagnetic flowmeter comprising:

a measuring tube through which a fluid to be measured flows;

an exciting coil configured to apply a magnetic flux to the fluid along a second direction orthogonal to a first direction, the first direction being a longitudinal direction of the measuring tube;

a pair of surface electrodes including a first surface electrode and a second surface electrode on an outer periphery of the measuring tube, the first and second electrodes being disposed opposite each other, with the measuring tube interposed therebetween, in a third direction orthogonal to the first and second directions;

a preamplifier substrate having a preamplifier mounted thereon, the preamplifier being configured to amplify electromotive forces detected by the pair of surface electrodes; and a pair of connection lines including a first connection line and a second connection line configured to electrically connect the first surface electrode and the second surface electrode, respectively, to the preamplifier, wherein the preamplifier substrate is disposed outside a flux region where a magnetic flux is produced, and extends in a direction intersecting the measuring tube.

* * * * *